(12) United States Patent
Miyaki

(10) Patent No.: US 6,542,817 B2
(45) Date of Patent: Apr. 1, 2003

(54) ROUTE SEARCH METHOD IN NAVIGATION SYSTEM

(75) Inventor: Ken Miyaki, Los Angeles, CA (US)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/804,738

(22) Filed: Mar. 13, 2001

(65) Prior Publication Data

US 2002/0133292 A1 Sep. 19, 2002

(51) Int. Cl.[7] ............................................... G01C 21/00
(52) U.S. Cl. ..................... 701/209; 701/201; 701/211; 340/995
(58) Field of Search ............................... 701/201, 209, 701/210, 211; 340/995

(56) References Cited

U.S. PATENT DOCUMENTS

| | | | | |
|---|---|---|---|---|
| 4,761,742 A | | 8/1988 | Hanabush et al. | |
| 5,608,635 A | * | 3/1997 | Tamai | 340/990 |
| 5,884,218 A | * | 3/1999 | Nimura et al. | 340/995 |
| 5,908,465 A | * | 6/1999 | Ito et al. | 340/995 |
| 6,208,934 B1 | * | 3/2001 | Bechtolsheim et al. | 340/988 |

\* cited by examiner

*Primary Examiner*—Michael J. Zanelli
(74) *Attorney, Agent, or Firm*—Brinks Hofer Gilson & Lione

(57) ABSTRACT

A route search method in a navigation system in which POI (Point of Interest) information regarding POIs is incorporated in map information and a route up to a specified POI is searched for. When a POI has a plurality of gateways, identification data for road links connected respectively to the gateways is incorporated in the POI information. When a certain POI is set as the destination, the navigation system refers to the POI information and checks whether a plurality of road links are stored corresponding to the set POI. If so, the system searches for a route up to each of the road links, and determines an optimum one of the found routes as the guide route.

14 Claims, 6 Drawing Sheets

ROUTE SEARCH METHOD IN NAVIGATION SYSTEM

BACKGROUND OF THE INVENTION

1. Field of the Invention

The present invention relates to a route search method in a navigation system, and more particularly to a route search method in a navigation system in which POI (Point of Interest) information regarding POIs is incorporated in map information, and a route up to a specified POI is searched for.

2. Description of the Related Art

In a navigation system, the position of a vehicle is detected and map data around the vehicle position is read out of a map storage medium such as a CD-ROM or DVD. Then, in the Map Guide Mode, a map around the vehicle and a guide route are generated and drawn on a display screen based on the map data and guide route data. At the same time, a mark of the vehicle position is displayed on the map at a predetermined point in overlying relation. As a vehicle's current position changes with movement of the vehicle, the map is scrolled with the vehicle position mark fixed at the center of the screen in its lower area, allowing the driver to always confirm a detailed map around the vehicle position at a glance. In the Arrow Guide Mode, a guide route, roads crossing the guide route, and so on are displayed in a simplified form, and the direction of travel at an intersection is indicated by an arrow. Also, the distance to the next intersection, the direction toward the destination, the distance to the destination, and so on are displayed. In addition, the direction of travel at an intersection is guided by a voice output.

To implement route guidance in the Map Guide Mode or the Arrow Guide Mode, a destination must be inputted to search for the guide route up to the destination. Various methods are available for inputting the destination. For example, there is a method of inputting the destination using a POI (Point of Interest). The destination can be inputted using a POI by;

(1) entering the Place Name of a POI representing the destination, or (2) entering the Place Type (category) of a POI representing the destination to display a candidate list of Place Names, and selecting one Place Name corresponding to the destination from the candidate list.

To input the destination by the above method (2), the user operates a menu key on a remote control to display a main menu on a screen (see FIG. 6A), and selects the menu item "Dest" from the main menu. With such a user's operation, the navigation system displays a screen image of "Find Destination by" for specifying a manner of inputting the destination, as shown in FIG. 6B. Then, upon the user selecting the menu item "Point of Interest", the navigation system displays two menu items, "Place Name" and "Place Type", as shown in FIG. 6C. Selecting the menu item "Place Type" causes the navigation system to display a screen image of "Select Category" that is a list of categories, as shown in FIG. 6D. With a certain category (e.g., shopping) selected from the category list, the navigation system displays an alphabet/numeric keyboard for prompting the user to enter the city name, as shown in FIG. 6E. Upon the user entering several letters of the spelling of the city name from the beginning, a list of city names having those letters is displayed in a scrollable manner. The user selects one desired city name (e.g., Costa Mesa) from the list, or enters the full spelling of the city name.

After completing the entry of the city name, the navigation system displays a list of all POIs in a scrollable manner, which exist in the city and belong to the specified category, as shown in FIG. 6F. Selecting a desired POI (e.g., Triangle Square) from the POI list causes the name, address, telephone number, etc. of the selected POI to be displayed as shown in FIG. 6G. If the displayed POI is correct as the destination, the user selects an item "OK to Proceed" to confirm the displayed POI as the destination. Thereafter, the navigation system searches for a guide route from the current position of the vehicle and displays the guide route. In the case of inputting the destination by the above method (1), the user selects the menu item "Place Name" in FIG. 6C, and then directly enters the name of a desired POI.

At some POIs, such as a large shopping mall or a baseball stadium, there exist many gateways (entrances and exits). In a conventional POI database structure, however, only one road link (gateway) is stored corresponding to one POI. Accordingly, regardless of whether the vehicle is positioned on the north, south, east or west of the target POI, the road link (gateway) finally obtained as a result of the route search has been always the same. In other words, a conventional navigation system has the problem that even when there is another gateway nearer to the vehicle position than the one gateway set in the system, the vehicle is not guided to the nearer gateway, but is always guided to the one gateway taking a longer distance.

Also, although a shopping mall (parent POI) usually has many shops (child POIs), the conventional navigation system always guides the vehicle to the same gateway no matter which one of the shops (child POIs) is the destination. Thus, another problem has been experienced in that the vehicle is not always guided to a gateway nearest to the target shop (child POI).

SUMMARY OF THE INVENTION

Therefore, one object of the present invention is to, when a POI having a plurality of gateways is set as the destination, enable a vehicle to be guided to a gateway nearest to the current position of the vehicle.

Another object of the present invention is to, when a parent POI has a plurality of gateways, enable a vehicle to be guided to the gateway nearest to a target shop (child POI).

According to the present invention, the first object is achieved by a route search method in a navigation system in which POI (Point of Interest) information regarding POIs is incorporated in map information and a route up to a specified POI is searched for, the method comprising the steps of (1) when a POI has a plurality of gateways, incorporating identification data for road links connected respectively to the gateways in the POI information; (2) when a plurality of road links are stored corresponding to a POI set as a destination, searching for a route up to each of the road links; and (3) determining an optimum one of the found routes as a guide route.

Also, according to the present invention, the second object is achieved by a route search method in a navigation system in which POI (Point of Interest) information regarding POIs is incorporated in map information and a route up to a specified POI is searched for, the method comprising the steps of (1) when a relationship between a POI and shops in the POI is defined as a parent-child relation, storing child POIs in corresponding relation to a parent POI and storing one road link in corresponding relation to each child POI as part of the POI information; and (2) when one child POI is set as a destination, searching for a guide route up to the road link corresponding to the set child POI.

Other features and advantages of the present invention will be apparent from the following description taken in conjunction with the accompanying drawings.

BRIEF DESCRIPTION OF THE DRAWINGS

DESCRIPTION OF THE PREFERRED EMBODIMENTS (A) Configuration of Navigation System In FIG. 1, numeral 11 denotes a map storage medium, such as a CD-ROM, for storing map information. Numeral 12 denotes a CD-ROM control unit for controlling the reading of map information from the CD-ROM. Numeral 13 denotes a position measuring device for measuring the current position of a vehicle. The position measuring device 13 comprises a vehicle speed sensor for detecting a distance through which the vehicle has traveled, a gyro for detecting a compass bearing of travel, a CPU for computing the current position, a GPS receiver, and so on. Numeral 14 denotes a map information memory for storing the map information read out of the CD-ROM. Numeral 15 denotes a POI database memory for storing POI database information read out of the CD-ROM. Numeral 16 denotes a remote control through which the user performs operations of, for example, selecting a menu item, scaling up or down a map, and inputting the destination. Numeral 17 denotes a remote control interface. As shown in FIG. 2, the remote control 16 has a joystick/enter key 16a, a menu key 16b, a cancel key 16c, an MP/RG key 16d, a zoom/scroll key 16e, a monitor on/off key 16f, etc.

Numeral 18 denotes a processor (CPU) for controlling the entirety of the navigation system, and 19 denotes a ROM for storing various control programs. Numeral 20 denotes a RAM for storing a result of processing such as a guide route, and 21 denotes a voice guidance unit for guiding the direction of travel at an intersection with a voice output. Numeral 22 denotes a display controller for generating a Map Guide image or an Arrow Guide image based on the map information. Numeral 23 denotes a VRAM for storing an image generated by the display controller, and 24 denotes a menu/list generator for generating a menu image or any of various list images. Numeral 25 denotes a synthesis unit, 26 denotes a monitor, and 27 denotes a bus.

(B) Structure of POI Database

The POI database memory 15 stores a number of POIs corresponding to various categories (such as hotel, restaurant, airport, station, shopping, sports complex, hospital, and golf courses). Further, corresponding to each POI, the POI database memory 15 stores the following data;

(1) polygon data of the POI,
(2) link data,
(3) detailed information (name, address, telephone number, category, etc.) of the POI, and
(4) child POI list if the POI is a parent POI.

Here, POIs that are theoretically related to each other, e.g., a POI and shops (tenants) in the POI, are defined as having a parent-child relationship. Then, the former is called a parent POI and the latter is called a child POI.

Figure 3:
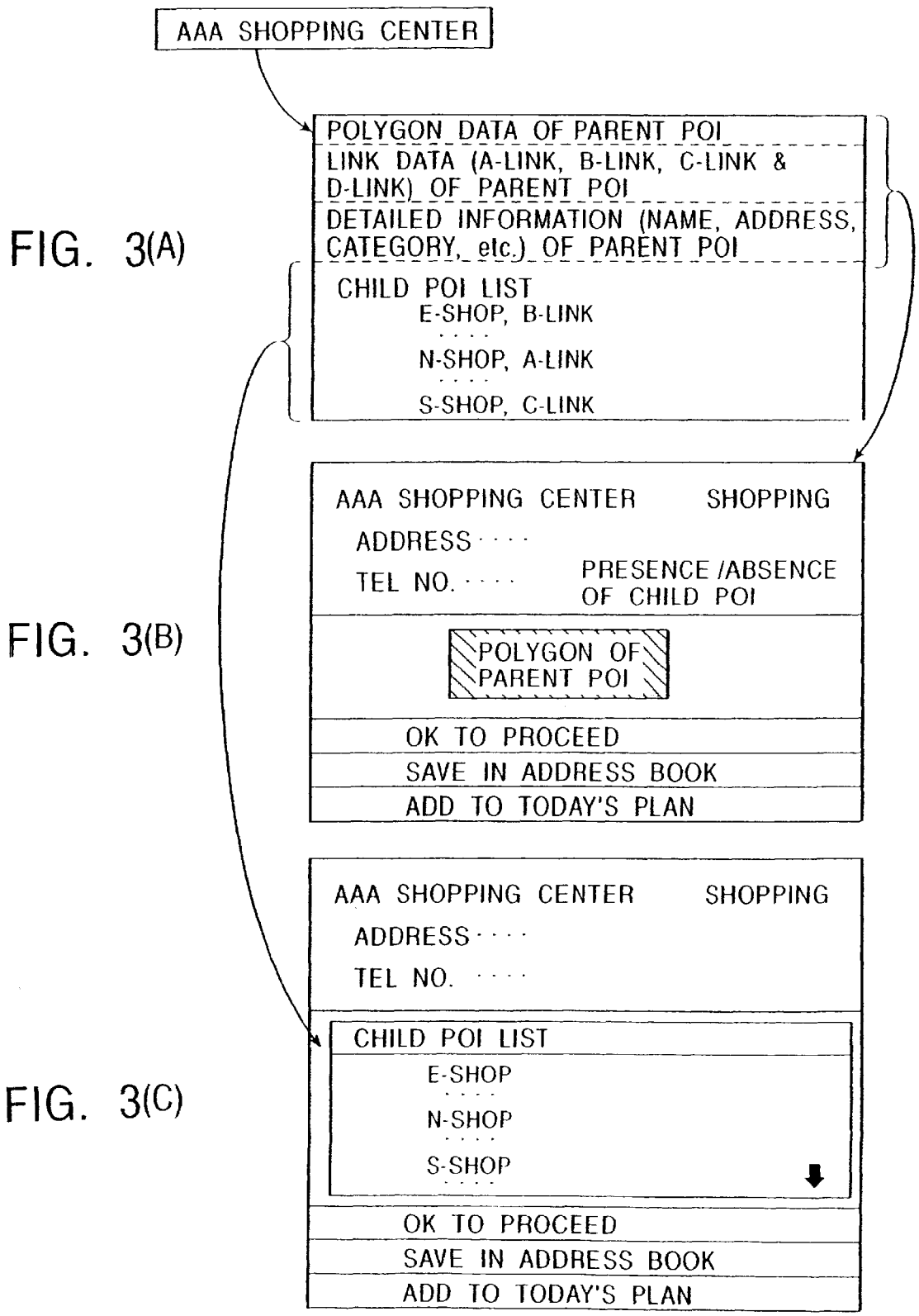
FIG. 3(A) is a representation for explaining a POI database structure.
FIG. 3(B) shows a displayed screen example of parent POI information.
FIG. 3(C) shows a displayed screen example of a child POI list.

FIG. 3(A) shows an example of a data set corresponding to one parent POI (AAA shopping center). As shown, the following data is stored corresponding to the parent POI "AAA shopping center":

(1) polygon data of parent the POI,
(2) link data of parent the POI,
(3) detailed information (name, address, category, etc.) of the parent POI, and
(4) list of shops as the child POIs.

Figure 4:
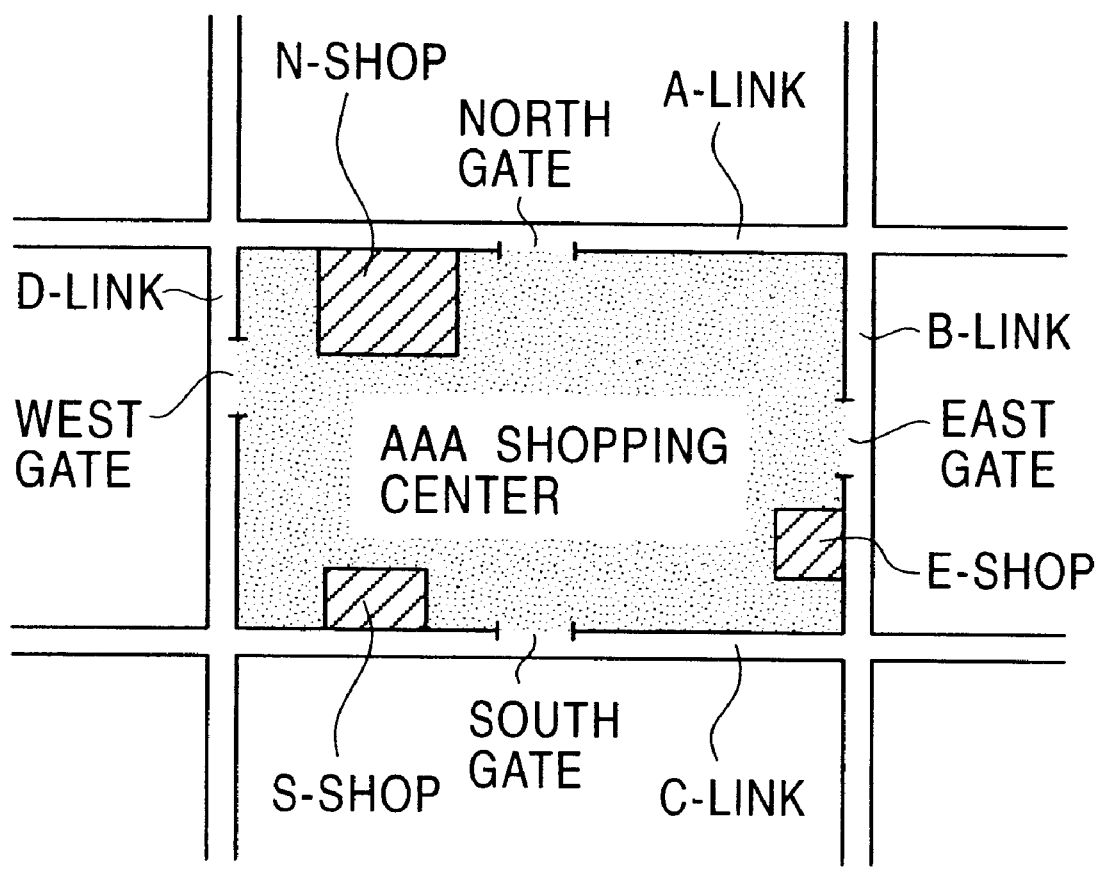
FIG. 4 is a representation for explaining a parent POI.

Assuming that the parent POI has four gateways and includes several child POIs as shown in FIG. 4, the link data of the parent POI (FIG. 3(A)) contains IDs of road links (A-link, B-link, C-link and D-link) connected respectively to the four gateways. Also, the child POI list (FIG. 3(A)) contains an N-shop, E-shop, S-shop ... which are child POIs and made correspondent to the IDs of the road links connected to the respective nearest gateways in one-to-one relation. Incidentally, as shown in FIG. 4, the parent POI "AAA shopping center" is assumed to have the following characteristics: (1) the parent POI has four gateways (north gate, south gate, east gate and west gate) at the north, south, east and west of the shipping center, (2) the road links A-link, B-link, C-link and D-link are connected respectively to the four gateways, and (3) the child POIs (N-shop, E-shop, S-shop ... ) exist within the parent POI.

(C) Route Search Processing

Figure 5:
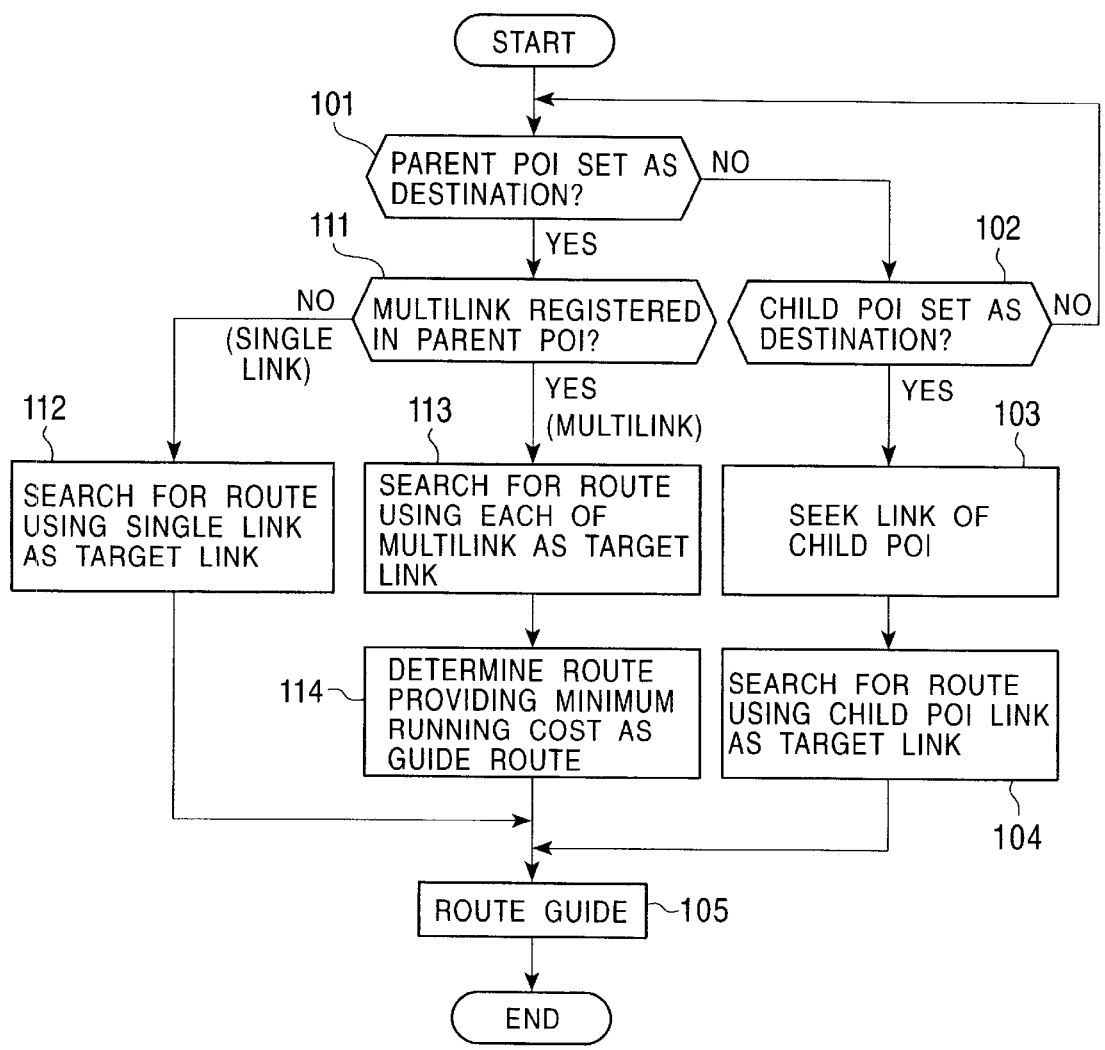
FIG. 5 is a flowchart of route search processing.
Figure 6A:
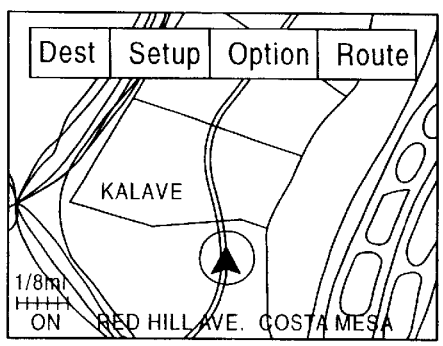
FIGS. 6A to 6G shows displayed screen examples for explaining the operation of inputting the destination based on a POI category.
Figure 6B:
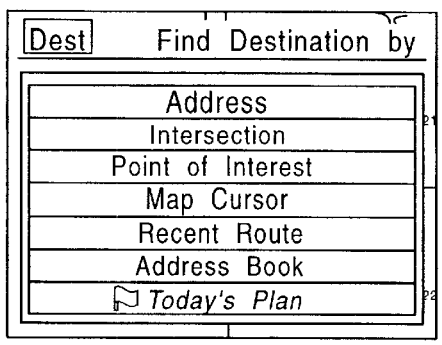
Figure 6C:
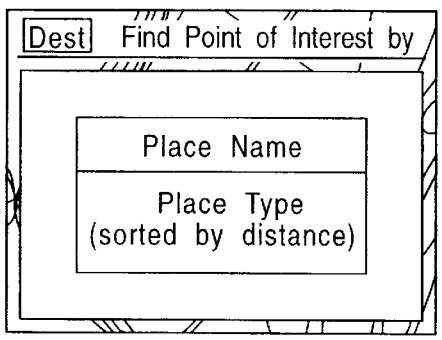
Figure 6D:
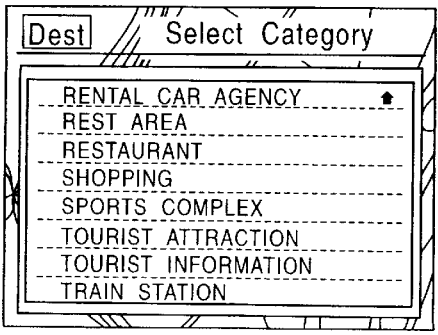
Figure 6E:
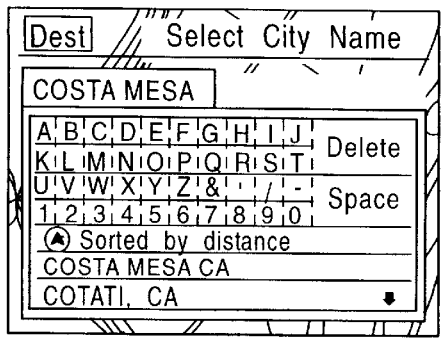
Figure 6F:
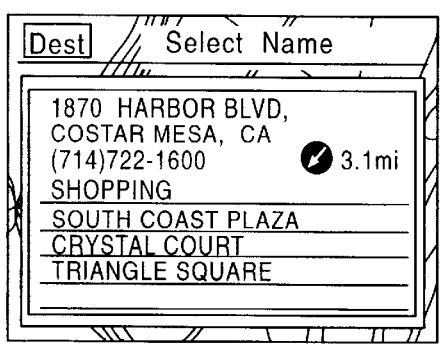
Figure 6G:
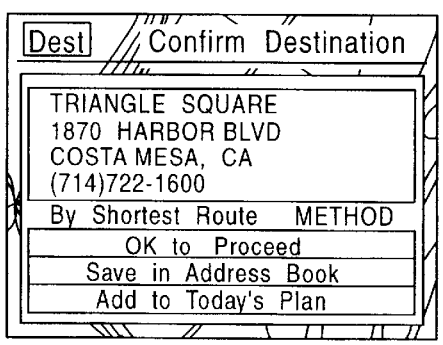

FIG. 5 is a flowchart of route search processing according to the present invention. First, it is checked whether a parent POI or a child POI has been set as the destination (Steps 101, 102).

Figure 1:
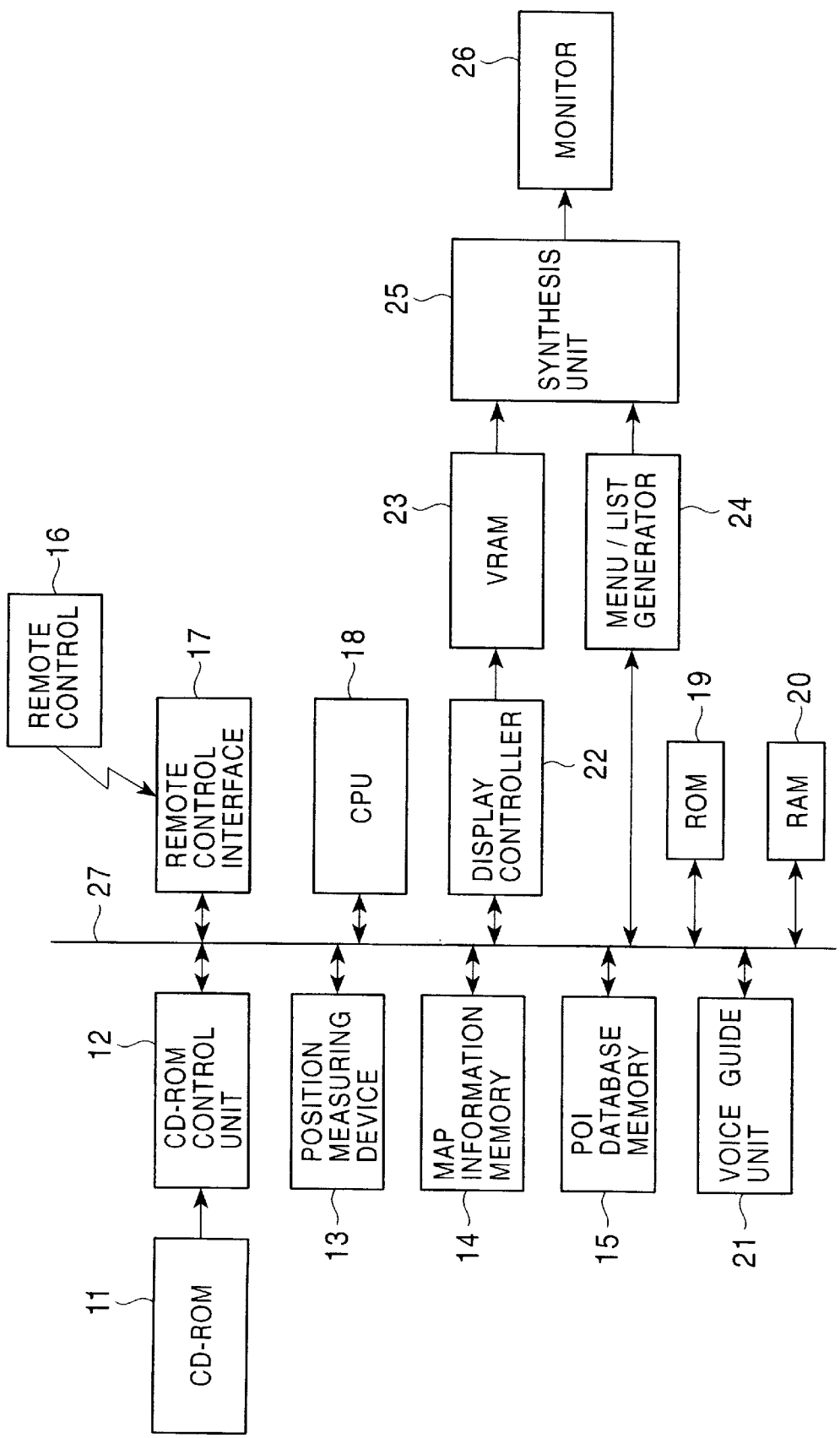
FIG. 1 is a block diagram of a navigation system according to the present invention.
Figure 2:
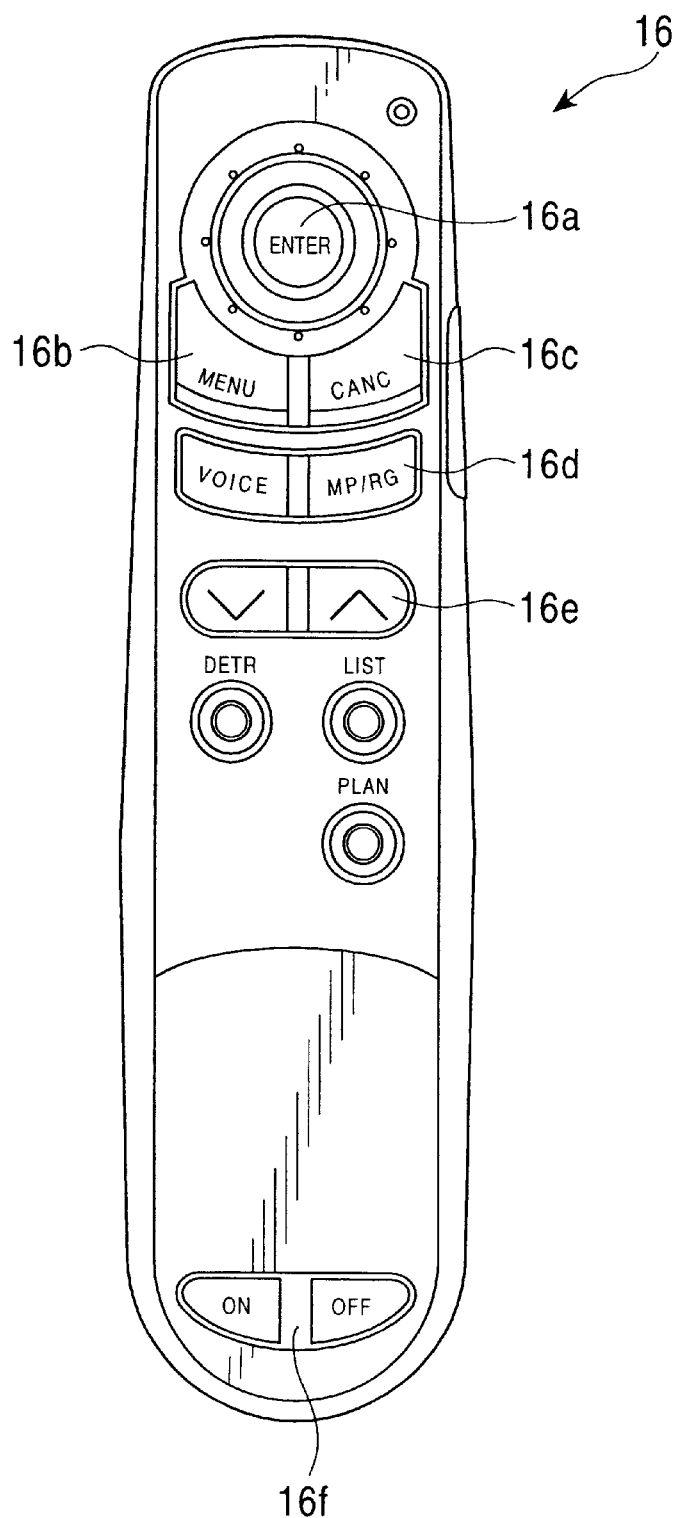
FIG. 2 is an explanatory view of a remote control.

For setting the destination using a POI, "shopping", for example, is inputted as a category and a certain POI (e.g., AAA shopping center) is selected from a POI list in accordance with the operations described above with reference to FIGS. 6A–G. Upon the AAA shopping center being selected as a parent POI, the navigation system displays detailed information of the parent POI, such as the name (AAA shopping center), address, telephone number and category (shopping), information indicating the presence/absence of child POIs, and the shape (polygon) of the parent POI, on the monitor screen as shown in FIG. 3(B). In this condition, the user can set the parent POI as the destination by selecting "OK to Proceed" and depressing the enter key 16a (FIG. 2) (Step 101).

On the other hand, for setting a child POI as the destination, the user tilts the joystick key 16a (FIG. 2) to the right after referring to the "information indicating the presence/absence of child POIs" and confirming the presence of child POIs. With such a tilting of the joystick key 16a, the navigation system displays the child POI list (tenant names) as shown in FIG. 3(C). Then, the user tilts the joystick key 16a upward or downward to scroll the tenant names and selects a desired child POI. Subsequently, the user selects "OK to Proceed" and depresses the enter key 16a, thereby setting the selected child POI as the destination (Step 102).

If the child POI is set as the destination in Step 102, an ID of a road link corresponding to the child POI is sought by referring to the POI database (Step 103). Then, a route search is made by using the sought road link as a target link (Step 104), and guide control is performed along the found route (Step 105). As a result, the vehicle can be guided to the gateway nearest to the target child POI.

On the other hand, if the parent POI is set as the destination in Step 101, whether a plurality of road link IDs are registered in the parent POI is checked by referring to the POI database (Step 111). If only one road link ID is registered, a route search is made by using that road link as a target link (Step 112), and guide control is performed along the found route (Step 105). If a plurality of road link IDs are registered, the route search is made by using each road link as a target link (Step 113). One of the found routes which provides a minimum running cost is then determined as the guide route (Step 114). Thereafter, guide control is performed along the determined route (Step 105). As a result, for the POI having a plurality of gateways, the vehicle can be guided to the gateway nearest to the current position of the vehicle.

According to the present invention, as described above, a vehicle can be guided to the gateway nearest to a target child POI. Also, for a POI having a plurality of gateways, a vehicle can be guided to the gateway nearest to the current position of the vehicle.

As many apparently widely different embodiments of the present invention can be made without departing from the spirit and scope thereof, it is to be understood that the invention is not limited to the specific embodiments described herein except as defined in the appended claims.

What is claimed is:

1. A route search method in a navigation system in which POI (Point of Interest) information regarding POIs is incorporated in map information and a guide route up to a specified POI is searched for, the method comprising the steps of:
   when a POI has a plurality of gateways, incorporating identification data for road links connected respectively to the gateways in said POI information;
   when a plurality of road links are stored corresponding to a POI set as a destination, searching for a route up to each of the road links; and
   determining an optimum one of the found routes as the guide route.

2. A route search method in a navigation system according to claim 1, wherein said optimum route is a route having the shortest running distance.

3. A route search method in a navigation system in which POI (Point of Interest) information regarding POIs is incorporated in map information and a guide route up to a specified POI is searched for, the method comprising the steps of:
   when a relationship between a POI and shops in the POI is defined as a parent-child relation, storing child POIs in correspondent relation to a parent POI and storing one road link in correspondent relation to each child POI as part of said POI information; and
   when one child POI is set as a destination, searching for a guide route up to the road link corresponding to the set child POI.

4. A route search method in a navigation system according to claim 3, wherein said road link stored in correspondent relation to each child POI is a road link connected to a gateway nearest to the child POI.

5. A route search method in a navigation system according to claim 3, further comprising the steps of:
   incorporating detailed information of the parent POI, including a name, address and category, a polygon of the parent POI, and a child POI list in said POI information;
   when the parent POI is selected, displaying the detailed information and the polygon of the parent POI;
   displaying a list of child POIs in the parent-child relation to the selected parent POI in response to a request; and
   inputting a destination by selecting a desired one of the displayed child POIs.

6. A route search method in a navigation system according to claim 5, wherein information indicating the presence of child POIs is displayed together with the detailed information of the parent POI.

7. A method of storing data on an information storage medium for use with a vehicle navigation system, comprising:
   storing information relating to a plurality of possible destinations, including a list of any sub-destinations within a destination; and
   for destinations having at least two gateways connected to different road links and having at least two sub-destinations, storing a correspondence between each sub-destination and a road link connected to a gateway.

8. A method according to claim 7, wherein the road link corresponding to a sub-destination is connected to the gateway nearest to the sub-destination.

9. A method according to claim 8, wherein the possible destinations are Points of Interest (POIs) and the sub-destinations are tenant POIs associated with a POI, the method further comprising storing with respect to each POI information identifying the presence or absence of tenant POIs.

10. A navigation system for a vehicle, comprising:
    a map storage medium for storing map information;
    a position measuring device for measuring the current position of the vehicle;
    a storage medium for storing control programs associated with route guidance;
    a processor for controlling the operation of the navigation system; and
    a display monitor;
    wherein the map information contains information relating to a plurality of possible destinations and, for a destination having a plurality of gateways connected to different road links, also contains an identification of said road links; and
    when a guide route is requested to a destination having a plurality of gateways connected to different road links, the navigation system searches for a route from the current position of the vehicle up to each of said road links and determines an optimum one of the found routes as the guide route.

11. A navigation system according to claim 10, wherein the destinations for which information is stored in the map information include Points of Interest (POIs), and the map information includes detailed information for each POI, including at least one of name, address, telephone number and category.

12. A navigation system according to claim 11, wherein the map information contains an identification of tenant POIs associated with a POI and, for POIs having plural gateways and plural tenant POIs, further contains information identifying the road link connected to the gateway nearest to each tenant POI.

13. A navigation system according to claim 12, wherein when a guide route up to a specified tenant POI is searched for, the system searches for a route from the current position of the vehicle up to the road link connected to the gateway of the POI nearest to the specified tenant POI.

14. A navigation system according to claim 10, wherein the map information contains a list of sub-destinations associated with a destination, and when a guide route up to a specified sub-destination is searched for, if the destination associated with the specified sub-destination has a plurality of gateways, the system searches for a route to the road link connected to the gateway nearest to the specified sub-destination.

* * * * *